US007985389B2

(12) United States Patent
Hoffman

(10) Patent No.: US 7,985,389 B2
(45) Date of Patent: Jul. 26, 2011

(54) DIRECT PROCESSING OF FERROTITANIA ORES AND SANDS

(75) Inventor: Glenn E. Hoffman, Lancaster, SC (US)

(73) Assignee: Cardero Resource Corporation, Vancouver, B.C. (CA)

( * ) Notice: Subject to any disclaimer, the term of this patent is extended or adjusted under 35 U.S.C. 154(b) by 0 days.

(21) Appl. No.: 12/452,848

(22) PCT Filed: Aug. 12, 2008

(86) PCT No.: PCT/US2008/010124
§ 371 (c)(1),
(2), (4) Date: Jan. 23, 2010

(87) PCT Pub. No.: WO2009/032111
PCT Pub. Date: Mar. 12, 2009

(65) Prior Publication Data
US 2010/0126310 A1    May 27, 2010

Related U.S. Application Data

(60) Provisional application No. 60/967,347, filed on Sep. 4, 2007, provisional application No. 60/997,616, filed on Oct. 4, 2007, provisional application No. 61/126,915, filed on May 8, 2008.

(51) Int. Cl.
*C22B 1/16*     (2006.01)
*C21B 13/00*    (2006.01)
*C21C 7/04*     (2006.01)
*C01G 31/02*    (2006.01)
*C01G 23/047*   (2006.01)

(52) U.S. Cl. ......... 423/62; 75/504; 75/584; 423/594.17; 423/610

(58) Field of Classification Search ............ 75/770–773, 75/507, 612, 10.38; 423/70, 69, 49, 62, 53
See application file for complete search history.

(56) References Cited

U.S. PATENT DOCUMENTS

| | | | | |
|---|---|---|---|---|
| 3,860,414 A | * | 1/1975 | Lang et al. ................ | 75/321 |
| 4,071,355 A | * | 1/1978 | Staggers ................... | 75/530 |
| 5,431,710 A | * | 7/1995 | Ebenfelt ................... | 75/443 |
| 6,306,195 B1 | * | 10/2001 | Das et al. ................. | 75/10.22 |
| 6,648,942 B2 | * | 11/2003 | Hoffman et al. ........... | 75/484 |
| 6,685,761 B1 | * | 2/2004 | Hoffman et al. ........... | 75/10.63 |

* cited by examiner

*Primary Examiner* — Roy King
*Assistant Examiner* — Tima M McGuthry-Banks
(74) *Attorney, Agent, or Firm* — Ralph H. Dougherty

(57) ABSTRACT

A method for producing pig iron by direct processing of ferrotitania sands, by the steps of:
  (a) mixing carbonaceous reductant, a fluxing agent, and a binder with titanium-containing materials selected from iron sands, metallic oxides, and/or iron ore concentrates, to form a mixture;
  (b) forming agglomerates from the mixture
  (c) introducing the agglomerates to a melting furnace;
  (d) melting the agglomerates at a temperature of from 1500 to 1760 C and forming hot metal with a slag thereon;
  (e) removing the slag;
  (f) tapping the hot metal; and
  (g) recovering the titanium and vanadium values.

31 Claims, 3 Drawing Sheets

*Fig.2*
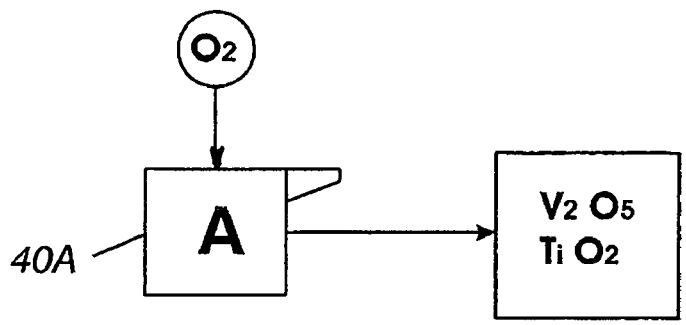
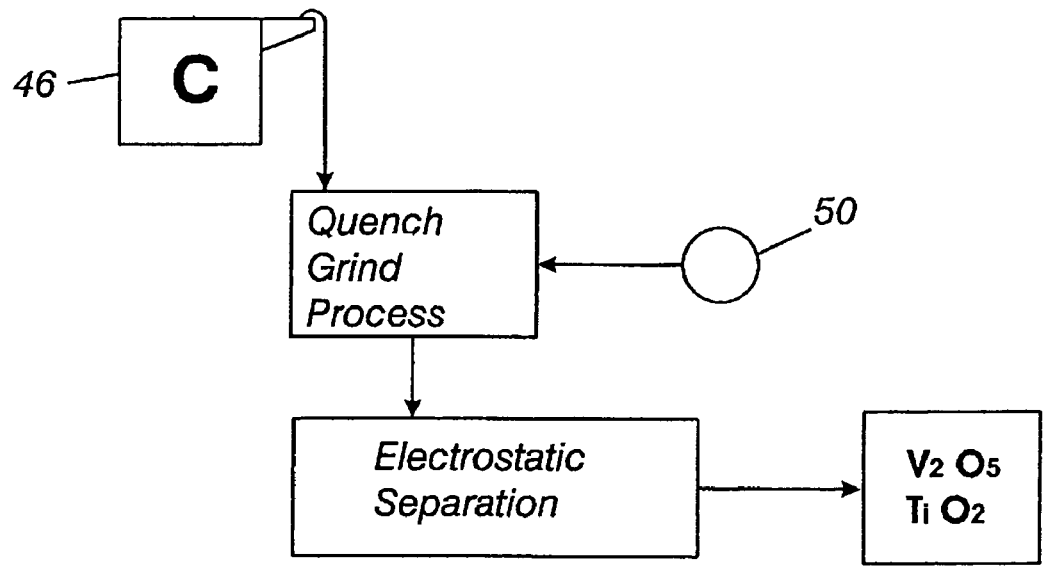
*Fig.3*

DIRECT PROCESSING OF FERROTITANIA ORES AND SANDS

CROSS REFERENCE TO RELATED APPLICATIONS

This application claims the benefit of priority of the following applications:
PCT Application PCT/US2008/010122 filed: 12 Aug. 2008, U.S. Provisional Patent Application Ser. No. 60/967,347, filed 4 Sep. 2007;
PCT Application PCT\US 2008\010124, filed: 12 Aug. 2008, U.S. Provisional Patent Application Ser. No. 60/997,616, filed: 4 Oct. 2007
PCT Application PCT\US 2008\010123, filed 12 Aug. 2008, and U.S. Provisional Patent Application Ser. No. 61/126,915, filed 8 May 2008.

FIELD OF THE INVENTION

The present invention relates to a method and apparatus for direct processing of ferrotitania ores and ferrotitania sands to produce pig iron employing the concept of combined cycle power generation using a gas combustion turbine.

SUMMARY OF THE INVENTION

Ferrotitania sands include vanadium compounds, whereas other ferrotitania ores may contain only a trace or no vanadium values. Iron sands, ferrotitania ores, ferrotitania sands and/or beach sands are cold briquetted to form compact agglomerates containing a carbonaceous material such as coal, petcoke, char, etc., iron oxide (either already contained in the ore or added separately as iron ore fines, mill scale, metalized iron fines, etc., to the mix), fluxes such as lime, silica, spar, etc., and binder. An excess amount of carbon is present in the agglomerate not only to react with the titania or manganese compounds but also to reduce the iron oxide, manganese oxide, etc., so that the melter atmosphere is predominantly CO with some liberated $H_2$ from the volatilization of the carbonaceous material such as coal. Sulfur in the system is free to combine with flux additions (CaO, MgO, $CaF_2$, etc.) to form a sulfur-containing liquid slag.

OBJECTS OF THE INVENTION

The principal object of the present invention is to provide a method of producing pig iron from ferrotitania ores and/or ferrotitania sands.
Another object of the invention is to provide a method of recovering vanadium oxide and titanium oxides from ferrotitania ores and/or sands.

BRIEF DESCRIPTION OF THE DRAWINGS

The foregoing and other objects will become more readily apparent by referring to the following detailed description and the appended drawings in which:
FIG. 2 is a schematic flowsheet for treating hot metal to form vanadium and titanium oxides.
FIG. 3 is a schematic depiction of a slag treatment to recover vanadium and titanium oxides.

REFERENCE NUMERALS REFER TO

10—iron sands, or ore concentrates—100% of which pass 10 mesh, Tyler Standard (1.70 mm), preferably 100% passing 100 mesh Tyler Standard (150 microns)
12—metallic iron fines, and iron oxide fines—100% minus 25 mm
14—prepared reductant, such as coal, petroleum coke, char, etc., 100% passing 25 mm, preferably 100% passing 100 mesh Tyler Standard (150 microns)
16—fluxing agents—CaO, MgO, $CaF_2$, $SiO_2$, $Al_2O_3$—100% minus 25 mm
18—binder such as cellulose, bentonite, molasses, starch—either organic or inorganic
20—recycled fines
22—mixer
24—briquetter/agglomerator (size 8 to 100 cc)
26—water addition (preferably spray)
28—pelletizer—drum or disc type
30—screens—dry or roller type
32—greenball dryer (dries pellets to 1% moisture or less)
34—agglomerate (briquette) curing/storage hoppers
36—feed loss in weight system
37—pressure seal
38—electric furnace or melter >1500 C
40—ladles A and B for liquid iron
42—slag addition for desulfurization
44—pig iron caster
45—pig iron
46—slag ladle (C)
48—slag disposal/quench bunker
50—recycle slag
52—offgas cooling scrubber/bag filter
54—compressor
56—stack with combustion to convert CO & $H_2$ to $CO_2$ & $H_2O$
58—high pressure compressor (100-350 psig)
60—optional gas stream, sulfur removal system, such as Selexol
62—high pressure gas accumulator tank
64—gas turbine (exit gas temp 600-700 C)
66—generator
68—waste heat boiler exchanger
70—high pressure steam turbine
72—generator
74—boiler closed circuit water conduit
76—pump
78—optional chiller upstream of gas sulfur removal system
80—optional supplemental fuel gas addition.
84—heater, preferably direct or indirect heated rotary kiln type

DETAILED DESCRIPTION

Figure 1:
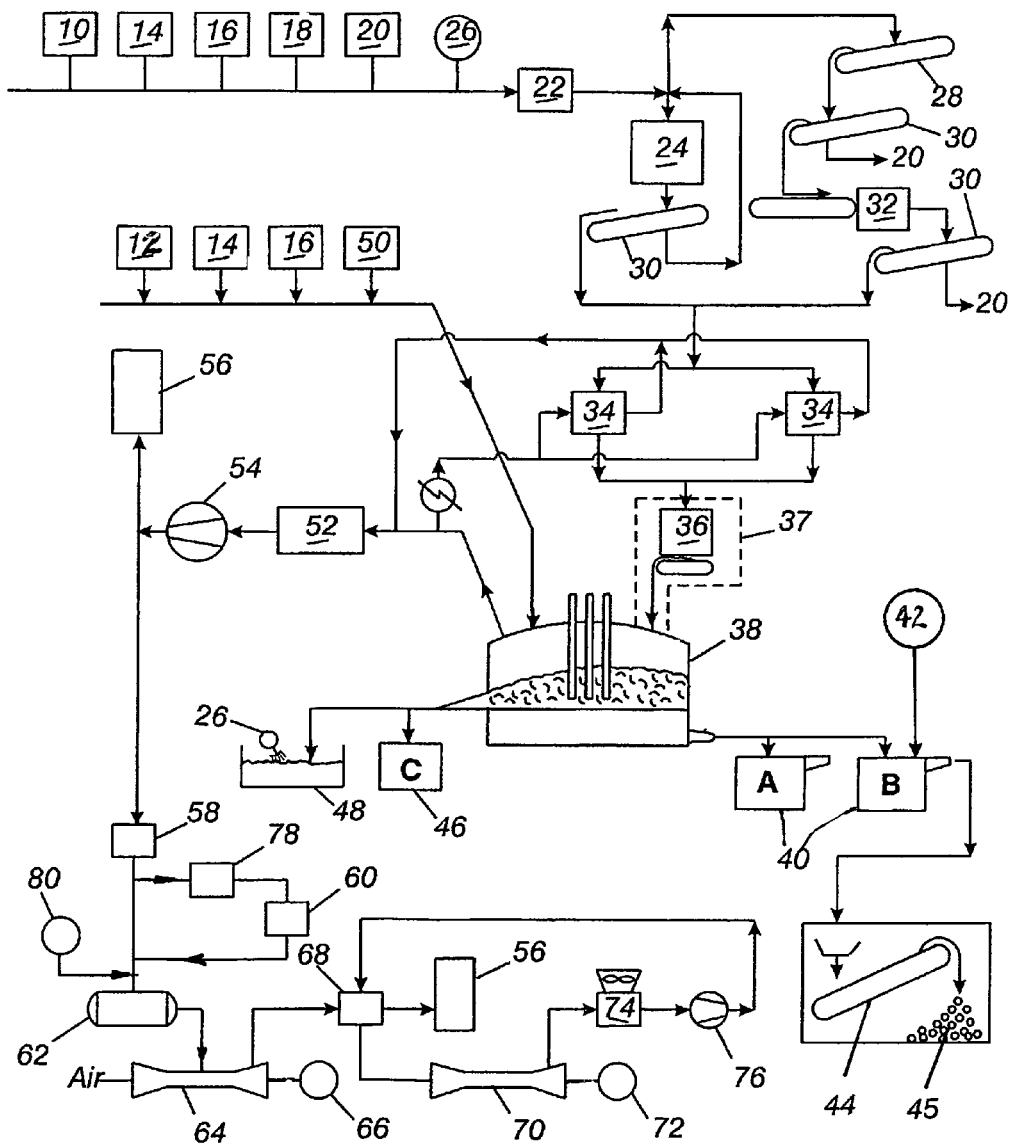
FIG. 1 is a schematic flowsheet of the process, wherein the reference numerals refer to the items as indicated below.
Figure 4:
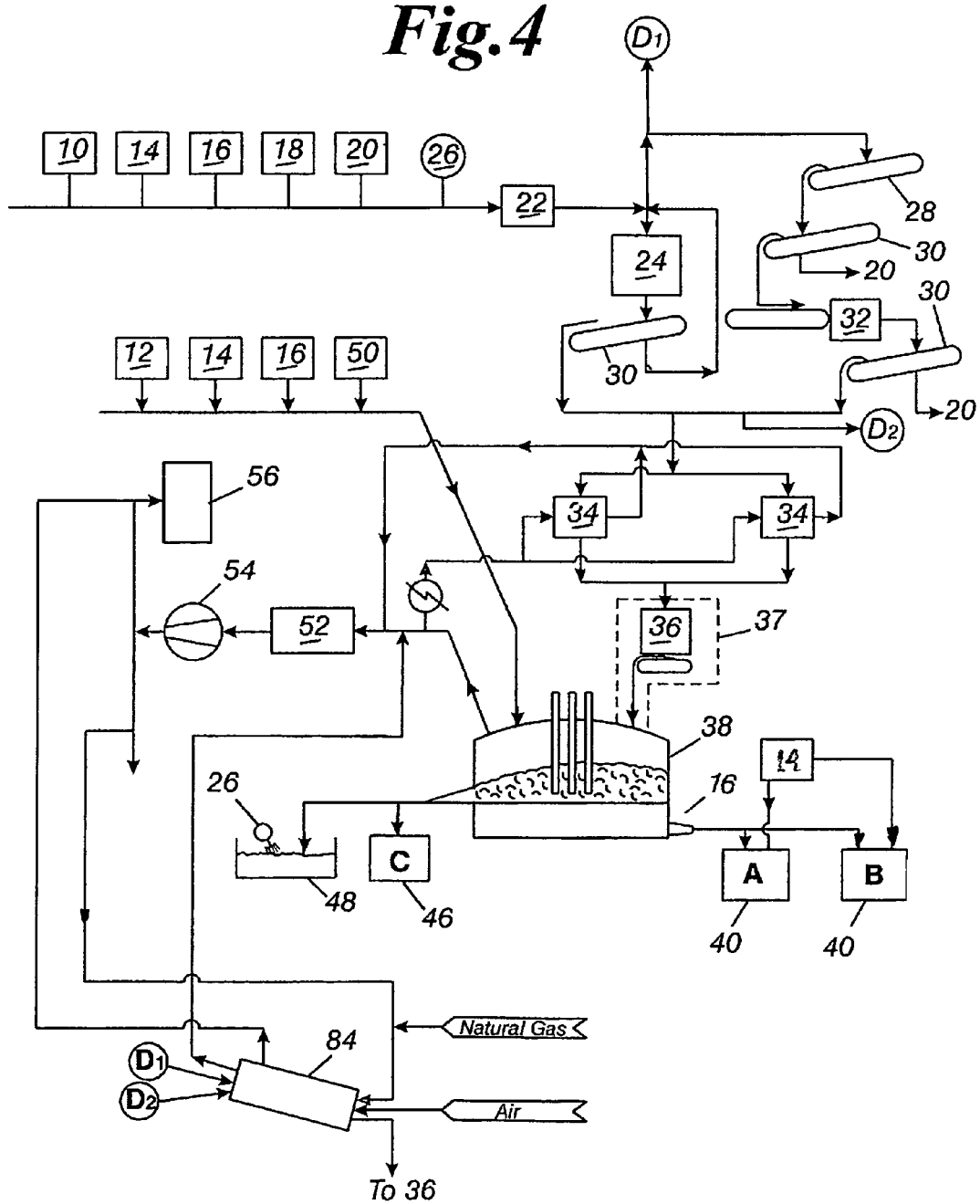
FIG. 4 is a schematic flowsheet showing an alternative to the invented process in which feed materials are preheated with or without agglomeration in a heater such as a rotary kiln, then fed to the melting furnace.

As shown in FIG. 1, feed materials are introduced to mixer 22, the input materials consisting of: iron sands, metallic oxides, and/or beach sands 10, 100% of which pass 10 mesh, Tyler Standard (1.70 mm), preferably 100% passing 100 mesh (150 microns); prepared reductant 14, such as coal, petroleum coke, char, or other carbonaceous material, 100% passing 25 mm, preferably 100% passing 100 mesh Tyler Standard (150 microns); slag formers or fluxing agents 16, such as MgO, CaO, $Al_2O_3$, $CaF_2$ (fluorspar), $SiO_2$, or combinations thereof, 100% of which are minus 25 mm; an organic or inorganic binder 18, such as cellulose, bentonite, molasses, or starch; recycled fines 20, and water 26 as needed. Optionally, metallic iron fines, and/or iron oxide fines 12, 100% of which are minus 25 mm, may be added to the feed materials.

The feed materials are mixed in mixer 22, then formed into agglomerates in briquetter/agglomerator 24, or in pelletizer 28 such as a drum or disc type pelletizer, the resulting agglomerates being in the form of uniformly sized briquettes or pellets, preferably from about 8 cc to 100 cc in size. The agglomerates are screened by sizer 30, which may be a dry screen or a roller type screen, the undersized material being returned to the agglomerator 24 or to the mixer 22.

Alternatively, material D1 exiting mixer 22 can be fed to a heater 84 for the purpose of preheating the mixture to about 500 to 1200 C, devolatizing the reductant, and producing a preheated charge to electric furnace melter 38. Pre-reduction of the iron oxide will occur to levels ranging from about 0 to 90%. Agglomerated material D2 can also be preheated, if desired, prior to feeding the material to the melter through the pressure seal 37. The heater 84 can be an indirectly heated rotary kiln, or a direct fired kiln, as shown, with off-gases being recycled. The heater 84 can be refractory lined, or it can be unlined, as desired.

Screened pellets from pelletizer 28 are dried in a greenball dryer 32 to 1% or less moisture content. The agglomerates are cured and/or stored in hoppers 34, then fed into an electric melting furnace 38 through a pressure-sealed feed system 37. Feed to the melter is through a pressure-sealed system, a conventional feed leg as is used with a shaft furnace, or through lock valves. Melter off-gas is treated, cooled and scrubbed in cooler-scrubber 52. Stack 56 includes combustion means for converting carbon monoxide and hydrogen to carbon dioxide and water vapor. The melter 38 operates normally under a slight positive pressure. Tapping is done on an intermittent basis.

Optionally one or more additional feed materials may be introduced through a pressure seal directly to the melter 38, such additional materials being selected from a group including metallic iron fines and iron oxide fines 12, 100% of which are minus 25 mm; prepared reductant 14, such as coal, petroleum coke, or other carbonaceous material, 100% of which are minus 25 mm, preferably 50% of which pass 10 mesh; slag formers or fluxing agents 16, such as MgO, CaO, $Al_2O_3$, $CaF_2$ (fluorspar) and $SiO_2$, 100% of which are minus 25 mm; and recycled slag 50.

Liquid iron is removed from the melter into ladles 40 and may be cast into pig iron 45 at pig caster 44, as shown. Additional fluxing agents 16 may be added to the hot metal as it is discharged into ladles 40 (A and B). A desulfurizing slag addition 42 is introduced into the hot metal ladle shown as B, the addition being CaO, MgO, Ca/Mg wire, or a mixture thereof.

In the event that vanadium or titanium reports to the hot metal, the hot metal in ladle 40A is treated as shown in FIG. 2 by oxidation to make $V_2O_5$ and $TiO_2$.

The hot metal from ladle 40 B is cast into pigs 45 in pig caster 44 as shown in FIG. 1.

The slag from the furnace 38 is drawn off into ladle C is treated as shown in FIG. 3 by quenching and grinding and electrostatic separation to recover $V_2O_5$ and $TiO_2$. The slag 50 from the ladle 46 C may be recycled to the melter 38, if desired.

The slag may include MnO, $Cr_2O_5$, $V_2O_5$, and $TiO_2$, which may be recovered by quenching and grinding the tapped slag, then separating the MnO, $Cr_2O_5$, $V_2O_5$, and $TiO_2$, by high intensity electrostatic separation and producing a concentrate that can be recycled to the melting furnace. Selective solvent extraction may be utilized to aid in separating the MnO, $Cr_2O_5$, $V_2O_5$, and $TiO_2$.

The operating parameters of the invented process are as follows:

| | Normal Range | Maximum |
|---|---|---|
| Iron Beach Sands Ferro-Titania Melter Temp. | 1500-1600 C. | 1700-1760 C. |
| Melter Off-Gas | 500-1500 C. | 1200-1650 C. |
| Melter Off-Gas Pressure | 0-0.2" $H_2O$ gauge | <15" $H_2O$ gauge |
| Gas Accumulator Off-Gas Pressure | 100-350 psig | |
| Gas Turbine Combined Product Exit Temp. | 750-900 C. | <1000 C. |

Offgas exiting the furnace 38 is cleaned in cooler-scrubber 52, is compressed in compressor 54, and may be used as combustion fuel in gas turbine 64. Gas turbine 64 drives generator 66 to produce electricity, and sensible heat contained in offgas exiting the gas turbine is recovered in a waste heat recovery boiler system 68. The waste heat boiler system steam cycle could be a "Kalina" cycle based on using 70% ammonia and 30% water for better range processing and heat recovery efficiency at lower gas temperatures. Ammonia/water boiling occurs over a range of temperatures rather that at a specific temperature and pressure. Steam produced by the waste heat boiler system 68 is then used to drive a steam turbine 70 and generator 72 to produce additional electricity. One of the principal objectives of the invention is to produce all the required electricity to accommodate the process and operate the plant so as to be electricity self sufficient. In the event that insufficient fuel is produced by the melter in the form of off-gas, additional fuel gas 80, such as natural gas, supplements the fuel gas feed to gas accumulator tank 62 and turbine 64.

Gas from the compressor 54 can be treated for sulfur removal in an optional sulfur removal system 60, which may require an optional chiller 78 upstream of the sulfur gas removal system.

The agglomerate curing or storage hoppers 34 can be preheaters, such as a shaft or vessel preheater, as desired. When used as preheaters, off-gas from the electric furnace or melter 38 can be utilized as shown in FIG. 1. The off-gas is returned to the gas handling system at cooler-scrubber 52.

SUMMARY OF THE ACHIEVEMENT OF THE OBJECTS OF THE INVENTION

From the foregoing, it is readily apparent that I have invented an improved method of producing pig iron from ferrotitania sands, as well as a method of recovering vanadium oxide and titanium oxides from ferro-titania sands.

It is to be understood that the foregoing description and specific embodiments are merely illustrative of the best mode of the invention and the principles thereof, and that various modifications and additions may be made to the apparatus by those skilled in the art, without departing from the spirit and scope of this invention.

What is claimed is:

1. A process for producing pig iron by direct processing of ferrotitania ores and sands, comprising the steps of:

(a) mixing:

I. materials selected from the group comprising: titania-containing iron sands, metallic oxides, and/or iron ore concentrates;
ii. carbonaceous reductant;
iii. fluxing agent; and
iv. a binder to form a mixture;
(b) forming agglomerates from said mixture;
(c) introducing said agglomerates to a melting furnace;
(d) melting the agglomerates at a temperature of from 1500 to 1760C and forming hot titanium-containing metal with a slag thereon;
(e) removing the slag;
(f) tapping the hot metal;
(g) treating the tapped hot metal by oxidation to form $TiO_2$, and to form $V_2O_5$ when vanadium values are present therein;
(h) recovering $V_2O_5$ and $TiO_2$ by quenching and grinding the tapped metal, then separating the $V_2O_5$ and $TiO_2$ by high intensity electrostatic separation; and
(i) recovering the titanium values.

2. A process according to claim 1, further comprising recovering MnO, $Cr_2O_5$, $V_2O_5$ and $TiO_2$ by quenching and grinding the tapped slag, then separating the MnO, $Cr_2O_5$, $V_2O_5$, and $TiO_2$, by high intensity electrostatic separation and producing a concentrate that can be recycled to the melting furnace.

3. A process according to claim 2, further comprising applying selective solvent extraction to aid in separating the MnO, $Cr_2O_5$, $V_2O_5$ and $TiO_2$.

4. A process according to claim 1, further comprising preventing substantially all air ingress to the melting furnace by providing a pressure seal.

5. A process according to claim 1, further comprising forming off-gases in the melting furnace, cleaning and cooling the off-gases, and utilizing the cleaned off-gases as combustion fuel to drive a turbine and to generate electricity.

6. A process according to claim 5, further comprising producing off-gases in the turbine, recovering the off-gases from the turbine and recovering the sensible heat contained therein as steam in a waste heat boiler recovery system.

7. A process according to claim 6, further comprising utilizing the steam to drive a steam turbine and an associated generator to produce additional electricity, thereby accommodating substantially all the electrical requirements of the process.

8. A process according to claim 1, wherein:
100% of the titania-containing iron sands, metallic oxides, and/or iron ore concentrates pass 10 mesh Tyler Standard (1.70 mm);
100% of the metallic iron fines and iron oxide fines are minus 25 mm;
100% of the carbonaceous reductant is minus 25 mm; and
100% of the fluxing agent is minus 25 mm.

9. A process according to claim 1 wherein the carbonaceous reductant is selected from the group consisting of coal, coke, petroleum coke, and char.

10. A process according to claim 1, wherein the fluxing agent is selected from the group consisting of CaO, MgO, $CaF_2$, $SiO_2$, $Al_2O_3$, and mixtures thereof.

11. A process according to claim 1, wherein the binder is selected from the group consisting of cellulose, bentonite, molasses, starch or mixtures thereof.

12. A process according to claim 1, further comprising maintaining a reducing atmosphere within said melting furnace.

13. A process according to claim 1, wherein at least one feed material selected from the group consisting of, metallic iron fines, iron oxide fines, carbonaceous reductant, slag formers, fluxing agents, and recycled slag is introduced directly into the melter.

14. A process according to claim 1, further comprising preheating the mixture, the agglomerates, or both, prior to introducing them to the melting furnace.

15. A process according to claim 14, further comprising preheating to a temperature of from 500 to 1200 C.

16. A process according to claim 14, wherein the mixture, agglomerates, or both, are preheated in a rotary kiln.

17. A process for producing pig iron by direct processing of ferrotitania ores and sands, comprising the steps of:
(a) mixing:
I. materials selected from the group comprising: titania-containing, iron sands, metallic oxides, and/or iron ore concentrates;
ii. carbonaceous reductant;
iii. fluxing agent; and
iv. a binder to forma mixture;
(b) forming agglomerates from said mixture;
(c) introducing said agglomerates to a melting furnace;
(d) melting the agglomerates at a temperature of from 1500 to 1760 C and forming hot metal with a titanium-containing slag thereon;
(e) removing the slag;
(f) recovering MnO, $Cr_2O_5$, $V_2O_5$ and $TiO_2$ by quenching and grinding the tapped slag, then separating the MnO, $Cr_2O_5$, $V_2O_5$ and $TiO_2$ by high intensity electrostatic separation and producing a concentrate that can be recycled to the melting furnace;
(g) tapping the hot metal as pig iron, and
(h) recovering the titanium values.

18. A process according to claim 17, further comprising applying selective solvent extraction to aid in separating the MnO, $Cr_2O_5$, $V_2O_5$ and $TiO_2$.

19. A process according to claim 17, further comprising preventing substantially all air ingress to the melting furnace by providing a pressure seal.

20. A process according to claim 17, further comprising forming off-gases in the melting furnace, cleaning and cooling the off-gases, and utilizing the cleaned off-gases as combustion fuel to drive a turbine and to generate electricity.

21. A process according to claim 20, further comprising producing off-gases in the turbine, recovering the off-gases from the turbine and recovering the sensible heat contained therein as steam in a waste heat boiler recovery system.

22. A process according to claim 21, further comprising utilizing the steam to drive a steam turbine and an associated generator to produce additional electricity, thereby accommodating substantially all the electrical requirements of the process.

23. A process according to claim 17, wherein:
100% of the titania-containing iron sands, metallic oxides, and/or iron ore concentrates pass 10 mesh Tyler Standard (1.70 mm);
100% of the metallic iron fines and iron oxide fines are minus 25 mm;
100% of the carbonaceous reductant is minus 25 mm; and
100% of the fluxing agent is minus 25 mm.

24. A process according to claim 1 wherein the carbonaceous reductant is selected from the group consisting of coal, coke, petroleum coke, and char.

25. A process according to claim 1, wherein the fluxing agent is selected from the group consisting of CaO, MgO, $CaF_2$, $SiO_2$, $Al_2O_3$, and mixtures thereof.

26. A process according to claim 1, wherein the binder is selected from the group consisting of cellulose, bentonite, molasses, starch or mixtures thereof.

27. A process according to claim 1, further comprising maintaining a reducing atmosphere within said melting furnace.

28. A process according to claim 1, wherein at least one feed material selected from the group consisting of, metallic iron fines, iron oxide fines, carbonaceous reductant, slag formers, fluxing agents, and recycled slag is introduced directly into the melter.

29. A process according to claim 1, further comprising preheating the mixture, the agglomerates, or both, prior to introducing them to the melting furnace.

30. A process according to claim 29, further comprising preheating to a temperature of from 500 to 1200 C.

31. A process according to claim 29, wherein the mixture, agglomerates, or both, are preheated in a rotary kiln.

\* \* \* \* \*